United States Patent Office 2,731,731
Patented Jan. 24, 1956

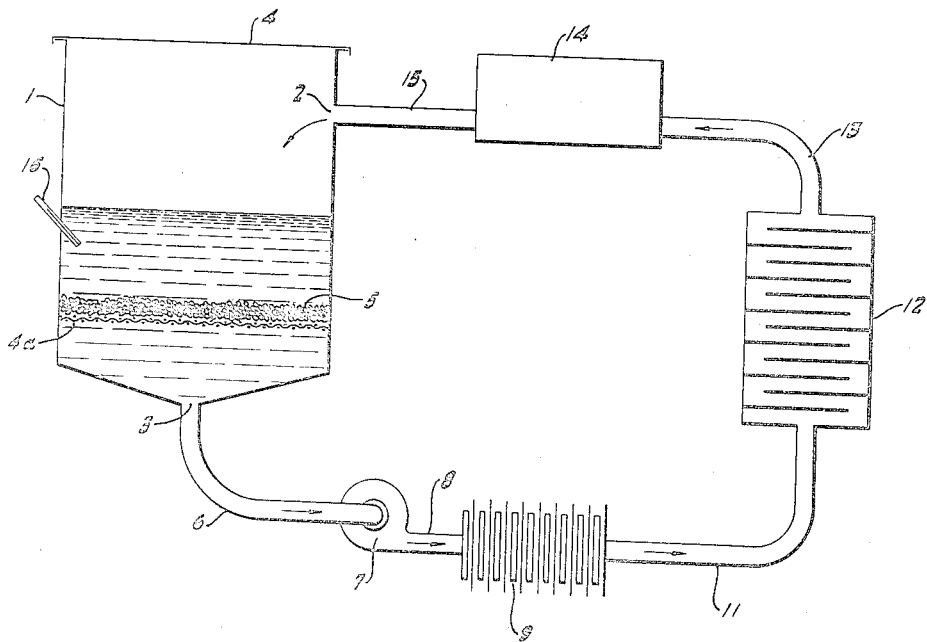

2,731,731
METHOD OF DRYING HEAT SENSITIVE BIOLOGICALLY ACTIVE SUBSTANCES

John H. Hink, Jr., Berkeley, and Frederick F. Johnson, Orinda, Calif., assignors to Cutter Laboratories, Berkeley, Calif., a corporation of California Application March 7, 1952, Serial No. 275,362

4 Claims. (Cl. 34—5)

This invention constitutes an improvement to the invention described in the pending application Serial No. 261,397, of John H. Hink, Jr., which was filed December 12, 1951, for "Method of Drying Human Serum Albumin and Other Heat Sensitive Biologically Active Proteins," and in general relates to and has for its object a method and equipment for continuously drying heat sensitive biologically active proteins and carbohydrates such as human serum albumin, diphtheria and tetanus toxoids, globulins and antitoxins, and dextran, without the necessity of employing such large volumes of water-miscible solvent.

One of the most important products of the fractionation of human plasma is human serum albumin. This protein alone represents more than half of the total proteins contained in plasma, and when the final purified albumin is obtained as a pasty precipitate consisting of approximately 25 per cent albumin, 30 per cent alcohol and 45 per cent water, it is necessary to remove all of the alcohol and it is desirable to remove all of the water so that the albumin can be stored indefinitely in a dry and stable state. Previously this has been accomplished only by freezing the albumin paste and subliming the alcohol and water from the ice under a high vacuum. Although albumin is a relatively stable protein as compared with most of the plasma proteins, the manner of its clinical usage requires that the albumin be maintained in virtually a native state and not be subjected to any appreciable degree of denaturation. Since albumin is a highly concentrated material for the emergency treatment of shock, it must remain stable in a concentrated solution under all sorts of prevailing temperatures for periods of approximately five years.

The so-called freeze drying process above referred to is objectionable in that it requires complex equipment and close attention over a period of many hours.

In the said pending Hink application, a process has been described for obviating the difficulties prevailing in the so-called freeze drying process wherein a wet precipitate of albumin is frozen solidly, the frozen precipitate is ground into relatively small particles without permitting the particles to melt, the frozen ground particles are introduced into a body of anhydrous acetone having a low temperature, the mixture is violently stirred until all of its ice content has melted and its albumin content appears as a fine granular suspension, the albumin granules are allowed to settle and the supernatant is decanted off, the resulting albumin sludge is filtered, the filter cake is repulped in anhydrous acetone; the resulting suspension is filtered to recover the granular albumin and wherein finally the granular albumin so separated is air dried or dried in any other conventional manner.

By resorting to this procedure and more particularly to the expedient of violently stirring the frozen ground albumin precipitate in the anhydrous acetone, the water melting from the ice content of the precipitate is immediately dissolved by the acetone and uniformly dispersed throughout the entire body thereof, thus avoiding localized zones or areas of relatively highly diluted acetone. This is of extreme importance for although albumin is unaffected by anhydrous acetone, its stability in this and similar reagents decreases as the water content of the reagent increases. The trick is therefore to dissolve the water content of the albumin precipitate in the desired reagent without permitting any portion of the reagent to become diluted to the point at which it will become injurious to the albumin. The rate at which the frozen albumin precipitate particles are stirred in the body of acetone of course determines the rate at which the water melting from these particles is dissipated in the acetone and the rate at which melting proceeds depends upon the temperature of the frozen particles and the temperature of the acetone into which they are stirred.

More specifically the object of the present invention is an improvement to the process above described wherein a body of a suitable solvent such as acetone is continuously circulated under the influence of a differential pressure through a fragmentary body of the frozen wet precipitate in question, a filter, a body of regenerable desiccant and a refrigerator.

Further objects and details of this invention will become apparent from the following example of a commercial scale operation.

Referring to the drawings:

The single figure of the drawings is a schematic diagram illustrating a continuous system embodying the objects of our invention.

As previously stated, albumin is recovered from plasma as a wet pasty precipitate containing approximately 25 per cent albumin, 30 per cent ethanol and 45 per cent water and has a pH range of 4.8 to 5.2. To prevent alcohol denaturation of the albumin the precipitate must be maintained at a temperature not higher than −5 degrees centigrade.

In carrying out these objects resort is had to the system illustrated in the drawings and conveniently comprising a 30-gallon jacketed tank 1 provided with an inlet 2 adjacent its upper end, an outlet 3 at its bottom and with a cover or lid 4 arranged to be sealed over its upper open end. Secured within the tank 1 above its lower end is a 20 mesh screen 4ª arranged to support a body or bed 5 of the material to be dried.

Communicating with the tank outlet 3 is a conduit 6 connected to a pump 7 which in turn communicates through a conduit 8 with the intake side of a filter press 9. Connected with the discharge side of the filter press 9 through a conduit 11 is a closed desiccator 12 containing any suitable regenerable chemical desiccant such as, for example, calcium chloride, soda lime, phosphorous pentoxide, magnesium perchlorate, silica gel and asbestos. Communicating with the discharge side of the desiccator 12 through a conduit 13 is a refrigerator 14 in turn communicating through a conduit 15 with the inlet 2 of the tank 1. Extending into the tank somewhat above the screen 4ª is a thermometer 16.

In the operation of this system about 60 liters of anhydrous acetone are introduced into tank 1 and circulated through the system for the purpose of depressing its temperature to −5 degrees centigrade or less as indicated by the thermometer 16.

This having been done, the pump 7 is shut down temporarily, the cover 4 removed and 15 to 20 kilograms of fragmented frozen wet precipitate of a heat sensitive protein is delivered to the screen 4ª. For this purpose the frozen precipitate fragments may be of size in the order of one-half inch and preferably at a temperature of −30 degrees centigrade. After the tank has been so charged its cover 4 is sealed thereto and the pump 7 is again placed in operation whereupon a continuous stream or body of solvent is circulated through the precipitate fragments and through the rest of the system. As a result of the gradual extraction of the water from the protein ice by the cold solvent, the water content of the protein ice fragments gradually melts into the solvent. Simultaneously the fine granular solid portion (precipitate per se) of the fragments from which the ice has melted forms a suspension in the solvent and in that form is conveyed by the pump 7 to the filter press 9 where the precipitate is separated from the solution. The solution then passes through the desiccator 12 wherein its water content is absorbed and the precipitate-free and water-free solvent then passes through the refrigerator 14 to be brought down to temperature and is then returned to tank 1.

Essential to this process is the avoidance of the dilution of the solvent used to a point where it is injurious to the material being dried. Although in drying albumin paste in accordance with this method a water content of 8% can be tolerated, it is preferable to maintain it as low as possible, less than 1% being obtainable by use of the present process without resorting to the use of large volumes of acetone. In drying heat sensitive proteins such as antitoxins and antibody globulins the water content of the solvent should be maintained below 1%. Some heat sensitive biologically active substances subject to drying by this method are sufficiently stable that the solvent need be maintained at a temperature only as low as 0 degree centigrade and may contain a water content as high as 10% without injury to such substances. The rate of melting of the ice content of the frozen precipitate can be controlled by controlling the size of the fragments into which the precipitate is broken and by controlling the temperature of the solvent used and by proper selection of these factors the rate of melting can be balanced with the rate of water absorption by the desiccator.

Periodically the treated precipitate can be discharged from the filter press and the desiccant regenerated by the application of heat. In the example of the process as above described the frozen albumin paste precipitate is entirely collected in about one hour.

Upon discharge of the treated precipitate from the filter press, it can be freed of entrained volatile solvent by exposure to air for a few hours or by conventional vacuum drying.

Other examples of volatile solvents suitable for this process are methyl ethyl ketone and methyl ethyl ether.

Obviously, a centrifuge can of course be substituted for the filter press.

By calculation we have found that the energy required to freeze the material being dried, and to maintain the solvent at −5 degrees centigrade or below, and to remove the water by heat from the regenerable desiccant is much less than the energy required to freeze the material being dried, and to evaporate the water from the frozen mass in a vacuum, and to recondense the vapor in the form of ice. The present process is, therefore, much faster, less cumbersome, and more economical than the conventional freeze-drying process.

We claim:
1. The process of drying a wet, heat sensitive, biologically active substance containing an aqueous phase comprising: freezing said substance, continuously flowing a body of cold, highly volatile, water-miscible, organic solvent inert with respect to said frozen substance in closed circuit through a body of frozen fragments of said substance, through a body of a regenerable chemical desiccant and through a refrigerator at a rate which will insure that the concentration of said solvent is always at least ninety per cent (90%) of the total volume.

2. The process of drying a wet, heat sensitive, biologically active protein comprising: continuously flowing a body of cold, highly volatile, water-miscible, organic solvent inert with respect to said protein in closed circuit through a body of frozen fragments of said protein, through a body of a regenerable chemical desiccant and through a refrigerator.

3. The process of drying a wet, heat sensitive, biologically active precipitate comprising: continuously flowing a body of cold, highly volatile, water-miscible, organic solvent inert with respect to said precipitate in closed circuit through a body of frozen fragments of said precipitate, through a body of regenerable chemical desiccant and through a refrigerator.

4. The process of drying a wet, heat sensitive, biologically active substance comprising: freezing said substance and breaking said frozen substance into fragments and then continuously flowing a body of cold, highly volatile water-miscible, organic solvent inert with respect to said substance in closed circuit through a body of said frozen fragments, through a filter and through a body of a regenerable chemical desiccant.

References Cited in the file of this patent

UNITED STATES PATENTS

| 1,979,124 | Tival | Oct. 30, 1934 |
| 2,278,670 | Rauer | Apr. 7, 1942 |
| 2,374,455 | Porsche et al. | Apr. 24, 1945 |
| 2,562,966 | Tannenberg | Aug. 7, 1951 |

FOREIGN PATENTS

| 245,761 | Switzerland | Nov. 30, 1946 |

OTHER REFERENCES

The Preparation and Preservation of Human Plasma, by Strumia et al., pages 408–496 of American Journal of Clinical Pathology, vol. II, June 1941; page 482 relied on.

Chemical Method of Obtaining Dry Blood Proteins for Transfusion Purposes, by Krishnan et al. The Indian Medical Gazette, vol. 79, July 1944. Pages 304 and 305.

The Medical Journal of Australia, February 28, 1942, page 246.

Amino Acids and Proteins, by Greenberg. Copyright 1951. Page 270.

Journal Amer. Pharm. Assoc., Sci. Ed., Pharmaceutical Abstracts, page 206, August 1945.